United States Patent
Kuhnert

(10) Patent No.: US 10,139,798 B2
(45) Date of Patent: Nov. 27, 2018

(54) PRODUCTION MACHINE OR MACHINE TOOL AND METHOD FOR OPERATING SUCH A MACHINE TOOL

(71) Applicant: SIEMENS AKTIENGESELLSCHAFT, München (DE)

(72) Inventor: Wolfram Kuhnert, Röhrsdorf (DE)

(73) Assignee: Siemens Aktiengesellschaft, Munich (DE)

( * ) Notice: Subject to any disclaimer, the term of this patent is extended or adjusted under 35 U.S.C. 154(b) by 319 days.

(21) Appl. No.: 14/879,152

(22) Filed: Oct. 9, 2015

(65) Prior Publication Data
US 2016/0103439 A1 Apr. 14, 2016

(30) Foreign Application Priority Data

Oct. 10, 2014 (EP) .................................... 14188424

(51) Int. Cl.
  *G05B 19/42* (2006.01)
  *G05B 19/042* (2006.01)
  *G05B 15/02* (2006.01)

(52) U.S. Cl.
  CPC ......... *G05B 19/0426* (2013.01); *G05B 15/02* (2013.01); *G05B 19/0428* (2013.01); *G05B 2219/23067* (2013.01)

(58) Field of Classification Search
  CPC ................ G05B 19/0426; G05B 15/02; G05B 19/0428; G05B 2219/23067
  USPC .................................................... 700/86–89
  See application file for complete search history.

(56) References Cited

U.S. PATENT DOCUMENTS

| 7,092,787 | B2  |   | 8/2006  | Kuhnert |                    |
|-----------|-----|---|---------|---------|--------------------|
| 7,225,037 | B2  | * | 5/2007  | Shani   | G05B 19/056 700/18 |
| 7,324,856 | B1  | * | 1/2008  | Bromley | G05B 19/056 700/86 |
| 7,590,541 | B2  | * | 9/2009  | Virji   | G10L 15/26 700/17  |
| 2004/0205185 | A1 |  | 10/2004 | Leonik |                    |
| 2004/0205700 | A1 | * | 10/2004 | Leu    | G06F 9/44 717/106  |

(Continued)

FOREIGN PATENT DOCUMENTS

| CN | 2849785 Y   | 12/2006 |
| CN | 102221828 A | 10/2011 |
| CN | 103870324 A | 6/2014  |

OTHER PUBLICATIONS

Jaffe, Matthew S., et al. "Software requirements analysis for real-time process-control systems." IEEE transactions on software engineering 17.3 (1991): pp. 241-258.*

(Continued)

*Primary Examiner* — Satish Rampuria
(74) *Attorney, Agent, or Firm* — Henry M. Feiereisen LLC

(57) ABSTRACT

A production machine or machine tool has a memory into which a part program incorporating HMI instructions in the form of script segments is loaded, wherein the HMI instructions are evaluated by a processing component during the execution of the part program and wherein a display unit is controlled by the processing component for displaying HMI outputs. A corresponding method and a computer program for executing the method are also disclosed.

7 Claims, 2 Drawing Sheets

(56) References Cited

U.S. PATENT DOCUMENTS

| | | | |
|---|---|---|---|
| 2007/0244583 A1* | 10/2007 | Rachut | G05B 19/0426 700/83 |
| 2010/0030348 A1 | 2/2010 | Scherer | |
| 2010/0301995 A1 | 12/2010 | Nguyen | |
| 2014/0121789 A1 | 5/2014 | Brandes et al. | |

OTHER PUBLICATIONS

Moller, Anders, et al. "Component-based context-dependent hybrid property prediction." ERCIM—Workshop on Dependable Software Intensive Embedded systems, Porto, Portugal, ERCIM. 2005.pp. 1-6.*

Ghule, Chandrashekhar, D. G. Wakde, and Gurjinder S. Virdi. "Design of HMI for multipurpose electrocardiography using higher level language (Visual C++)." Biomedical and Pharmaceutical Engineering, 2009. ICBPE'09. International Conference on. IEEE, 2009.pp. 1-4.*

* cited by examiner

PRODUCTION MACHINE OR MACHINE TOOL AND METHOD FOR OPERATING SUCH A MACHINE TOOL

CROSS-REFERENCES TO RELATED APPLICATIONS

This application claims the priority of European Patent Application, Serial No. 14188424.7, filed Oct. 10, 2014, pursuant to 35 U.S.C. 119(a)-(d), the content of which is incorporated herein by reference in its entirety as if fully set forth herein.

BACKGROUND OF THE INVENTION

The present invention relates to a program-controlled production machine or machine tool, also referred to below as a machine for short, together with a method of operating such a machine. Here, the term production machine or machine tool is generally to be understood as a program controlled automation system, and hence for example also as an industrial robot.

The following discussion of related art is provided to assist the reader in understanding the advantages of the invention, and is not to be construed as an admission that this related art is prior art to this invention.

Production machines and machine tools are known in the art. The term machine tool is used to refer to all machines which are used, among other purposes, for processing work on workpieces with tools in mechanical engineering and toolmaking. Machine tools thus include, especially, so-called NC- or CNC-machines. One example of a production machine is a printing machine. It is well-known that an industrial robot is a programmable universal machine, which is intended and equipped for processing work on and handling of workpieces and for assembly activities.

In the case of machines of the aforementioned type, an operator can usually influence, for example parameterize or configure the machine. Displays required for these purposes, for example in the form of outputs with a display device in the form or similar to a display screen, or inputs for example via a keyboard or the like, are typically performed via an operator control and monitoring system. Such an operator control and monitoring system can be realized as a device which is stand-alone but is assigned to the production machine or machine tool, or as functionality which is incorporated into the production machine or machine tool. When an operator control and monitoring system is referenced hereinafter, this is always meant to include both possible forms of embodiment.

In the operation of the production machine or machine tool, the operator control and monitoring system is used, for example, to display system states (position information, status or error messages, etc.). Dialog masks used for this purpose have until now been programmed specifically for each application situation, and are integrated either permanently or for downloading into a so-called run-time environment of the production machine or machine tool.

It would therefore be desirable and advantageous to obviate prior art shortcomings and to provide an improved machine of the aforedescribed type and a method for its operation, which permits greater flexibility in the specification and/or processing of dialog masks or the like.

SUMMARY OF THE INVENTION

The production machine or machine tool has, as is known in the art, a processor together with a memory. Loaded into the memory is a part program which can be executed by the processor and which is executed when the machine is operating. The part program also incorporates instructions for a control and monitoring system which is either incorporated into the production machine or machine tool or is assigned to it. Such a control and monitoring system is also often referred to as an HMI (Human-Machine-Interface) system, and accordingly in what follows the instructions in the part program which relate to it are referred to briefly as HMI instructions. During the execution of the part program, these HMI instructions can be evaluated by a processing component. Here, the processing is carried out such that a display unit of the operating and control system, for example a screen or the like, can be controlled by the processing component for displaying HMI outputs, and is controlled during the operation of the machine.

One advantage of the approach suggested here consists in the fact that the part program incorporates the HMI instructions, so that the display of an HMI output can be directly dependent on the status of the part program and/or of statuses of the production machine or machine tool which are administered by the part program. This permits the greater flexibility, mentioned further above, in the specification or processing of the HMI outputs. Apart from the embedding of the HMI instructions in the part program, this is based on the processing component. This processing component is software functionality which is defined and equipped to evaluate the HMI instructions in a way similar to an interpreter. The result of such an evaluation can be the need to show or change an HMI element on the display unit. An HMI element permits, for example, the representation of a measured value, an item of position data, a user input and so on, or the showing of a graphical representation of a part of the machine, this last if necessary together with a measured value, an item of position data, a user input etc. Accordingly, an HMI element may if necessary have an underlying parameterizable template, so that the one and same template can be used for showing, for example, several measured values. A relevant HMI element which is to be used will be uniquely referenced in the HMI instructions, for example by an appropriate label. Hence, in what follows the expression HMI element identifies either a label used within the HMI instruction, the resulting display on the display unit or the underlying template, depending on the context.

Use of the processing component makes it possible to separate out logically the HMI instructions included in the part program during its processing. The HMI instructions are evaluated in such a way that HMI elements in them can be identified by the relevant labels which are used. The program code instructions required for the display of any particular HMI element do not need to be part of the part program, and most importantly do not need to be executed interpretively. Instead, when an HMI element referred to in the HMI instructions is identified, the processing component is used to invoke program code instructions, collected together in a library or the like, for the suitable display of the HMI element concerned.

Over and above this, the processing component incorporates a language element evaluation unit together with an HMI element administration unit, wherein the language element evaluation unit can, by reference to the HMI instructions, identify HMI elements referred to there and, by the HMI administration unit, an HMI output can be generated for each identified HMI element.

The language element evaluation unit carries out a syntactical and/or semantic evaluation of the HMI instructions or each HMI instruction individually. In doing this, the language element evaluation unit functions like a so-called parser, and hence will also be referred to below for short as a parser. The result of the processing of an HMI instruction by such a parser can be a label used in the HMI instruction, that is the referencing of an HMI element. The reference to the identifying label concerned can be used in invoking the HMI element administration unit, which acts in a certain sense as an access function for an HMI element library. This library incorporates suitable program code instructions for the display of a plurality of HMI elements, and for each permits the invocation of an HMI element for the display (HMI output) on the relevant display unit.

According to an advantageous embodiment of the present invention, the processing component may act as a means for evaluating a syntax and/or semantics defined for the HMI instructions. Here it may be, for example, that the HMI instructions are embedded in the part program in an XML format or the like. It is known that an XML format is comparatively easy to evaluate automatically, and in spite of its simple automatic evaluability is nevertheless very easy for a programmer or other operating staff to read, so that HMI instructions in such a format can easily be created, and equally easily modified and/or maintained.

According to another advantageous feature of the present invention, HMI instructions incorporated in the part program may cause additional HMI instructions to be created automatically. These additional HMI instructions can refer more individually to the status of the part program and/or to statuses of the production machine or machine tool which are administered by the part program.

The invention is implemented in software and hence does not only relate to the production machine or machine tool as a device together with a corresponding method for its operation, but also to a computer program with program code instructions which can be executed by a computer together with a storage medium with a computer program of this type, that is a computer program product with program code facilities, and finally also to a production machine or machine tool into the memory of which such a computer program is or can be loaded as a means of executing the method.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
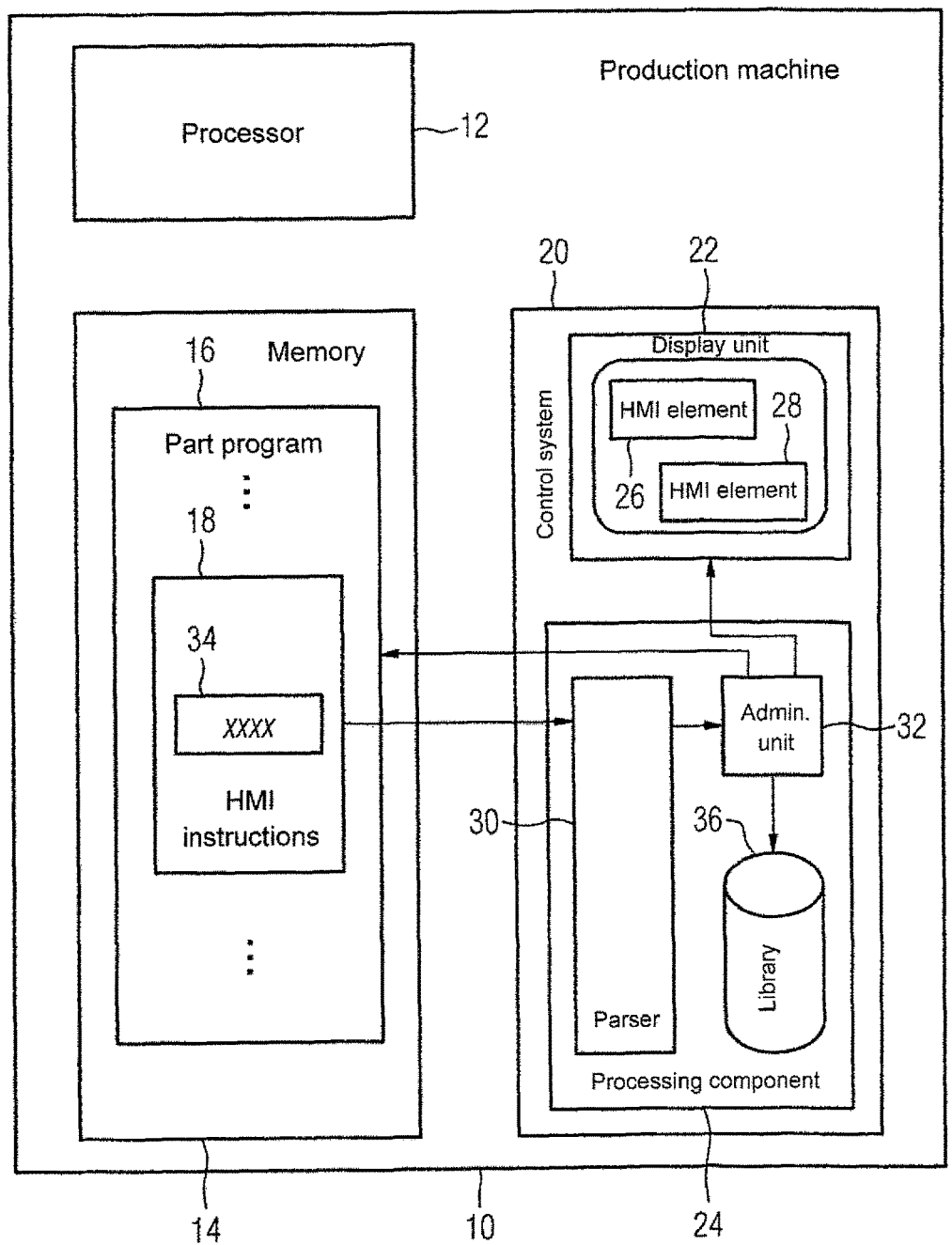
FIG. 1 shows a schematic diagram of a production machine or machine tool according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown in a schematically simplified form and with no specific details a production machine or machine tool 10, referred to below for short as a machine 10. This incorporates, in a way which is known per se, a processing unit in the form or nature of a processor 12 together with a memory 14. Loaded into the memory 14 is a part program 16, which can be executed by the processor 12 and which in turn defines specific functionality of the machine 10. The part program 16 incorporates HMI instructions 18 and these are provided indirectly or directly for the actuation of a control and monitoring system 20 which is either in the form of a stand-alone device assigned to the machine 10 and linked to this for communication purposes in a basically known manner, or is integrated into the machine 10.

The control and monitoring system 20 incorporates a display unit 22, such as for example a screen or the like, together with a processing component 24. This processing component 24 is software functionality implemented in the form of a computer program, possibly distributed, so that this can also be loaded together with the part program 16 into the memory 14 or into a memory, not shown separately, of the control and monitoring system 20. Since the processing component 24 is, at least functionally, assigned to the control and monitoring system 20, it is shown in the diagram in FIG. 1 as a part of the control and monitoring system 20.

By the processing component 24, the display unit 22 can be controlled for the purpose of creating HMI outputs, namely for the display of HMI elements 26, 28. An HMI element 26, 28 is, for example, a display of positional data for the machine 10 concerned, the display of an input field, for example for parameterizing or configuring the machine 10, a graphical display of the machine 10 itself or of a machine element, if necessary supplemented by an item of status data and/or an input field, etc.

The processing component 24 acts a means of evaluating a syntax and/or semantics, which are defined for the HMI instructions 18 where, for example, it might be that the HMI instructions 18 are incorporated into the part program 16 in an XML format or the like.

In the case of the form of embodiment shown, the processing component 24 incorporates a language element evaluation unit 30 together with an HMI element administration unit 32, in what follows referred to for short simply as an administration unit 32. The language element evaluation unit 30 makes available a function such as is known per se from a so-called parser, and correspondingly in what follows is referred to as a parser 30 for short. The HMI instructions 18 are evaluated by the parser 30. In doing so successive individual labels 34 incorporated in the HMI instructions 18 are, for example, identified.

In the diagram in FIG. 1, only one label 34 is shown, and this too only in a symbolically simplified form. The character string "xxxx" here stands for any meaningful character string which may be used within the HMI instructions 18, for example the character string "Input field", which references a corresponding HMI element 26, 28 in the form of a unique label 34. Thus in the case of a label 34 "Input field" an HMI element 26, 28 for the graphical display of such an input field is referenced.

If the parser 30 has separated out, by a separation corresponding to the syntax and/or semantics used in each case during the formulation of the HMI instructions 18, a label 34 incorporated in the HMI instructions 18 and in this way has identified a relevant referenced HMI element 26, 28, it is possible by the administration unit 32 to generate on the display unit 22 an HMI output for each identified HMI element 26, 28. In doing this, the administration unit 32 functions to some extent as an interface or access to a library 36 with HMI functions. If a relevant identified label 34 is communicated to the administration unit 32, by reference to this label a selection is made in the library 36 of an associated HMI function together with the subsequent invocation of the relevant HMI function, so that an appropriate HMI display results on the display unit 22. Here, the administration unit 32 is also responsible for the handling, evaluation and/or processing of user inputs or other operating actions of the user in respect of an HMI element 26, 28, and in doing so, for example, passes back to the part program 16 a numerical value input by a user as part of a parameterization.

Because the HMI instructions 18 are embedded in the part program 16 in the form of script segments or the like, the nature or content of HMI outputs can depend on the HMI instructions 18 incorporated in the part program 16. The interpretation of the HMI instructions 18 is defined by processing rules previously agreed, or defined in the part program 16. The processing of the HMI instructions 18 and/or of the processing rules is effected by a processing component 24, which is integrated into the run-time environment of the machine 10 concerned or into the run-time environment of a control and monitoring system 20 incorporated into the machine 10 or assigned to the machine 10. In the case of the form of embodiment shown, the processing is effected by the parser 30 together with the administration unit 32. The parser 30 carries out the interpretation of the HMI instructions 18 and forwards the processed instructions, here for example identified labels 34, to the administration unit 32. This latter is responsible for the generation of the graphical and/or interactive control elements, that is for the generation of the relevant HMI output. The parser 30 and administration unit 32 can also form one unit.

The processing component 24 can be assigned to the relevant part program 16 by a user. The processing component 24 can also be activated from within the relevant part program 16 by the execution of an instruction which leads to an HMI output.

The processing component 24, in particular its parser 30, can for example here also process and evaluate so-called XML-schema definitions. Using an XML-schema it is, for example, possible to define an HMI element 26, 28 composed of several HMI elements 26, 28, where the specific form of the composition can depend on the status of the part program 16 and/or on the status of the machine 10. The processing component 24, in particular its parser 30, can in addition or alternatively also process and evaluate conditional instructions, so that HMI outputs which depend on the status of the part program 16 and/or on the status of the machine 10 are also possible. An example of this is the pseudocode copied in below:

```
IF ( condition ) THEN
    label1 [ Parameter ]
ELSE
    label2 [ Parameter ]
END
```

An example of a condition evaluated in this case by the processing component 24, in particular its parser 30, is a condition which refers to a variable used in the part program 16, where the variable represents for example a status of the part program 16 or of the machine 10, that is for example a condition such as:

"IF (Automatic=ON) THEN"

It is then possible, by different labels 34 and depending on the condition concerned, to invoke individual HMI elements 26, 28 as the HMI output.

In addition it is also possible within the part program 16, and/or the HMI instructions 18 in it, to set up definitions which are taken into account in the evaluation of the HMI instructions by the processing component 24, in particular its parser 30, thus for example a definition such as:

"DEFINE Automatic=(condition1) AND NOT (condition2)"

Figure 2:
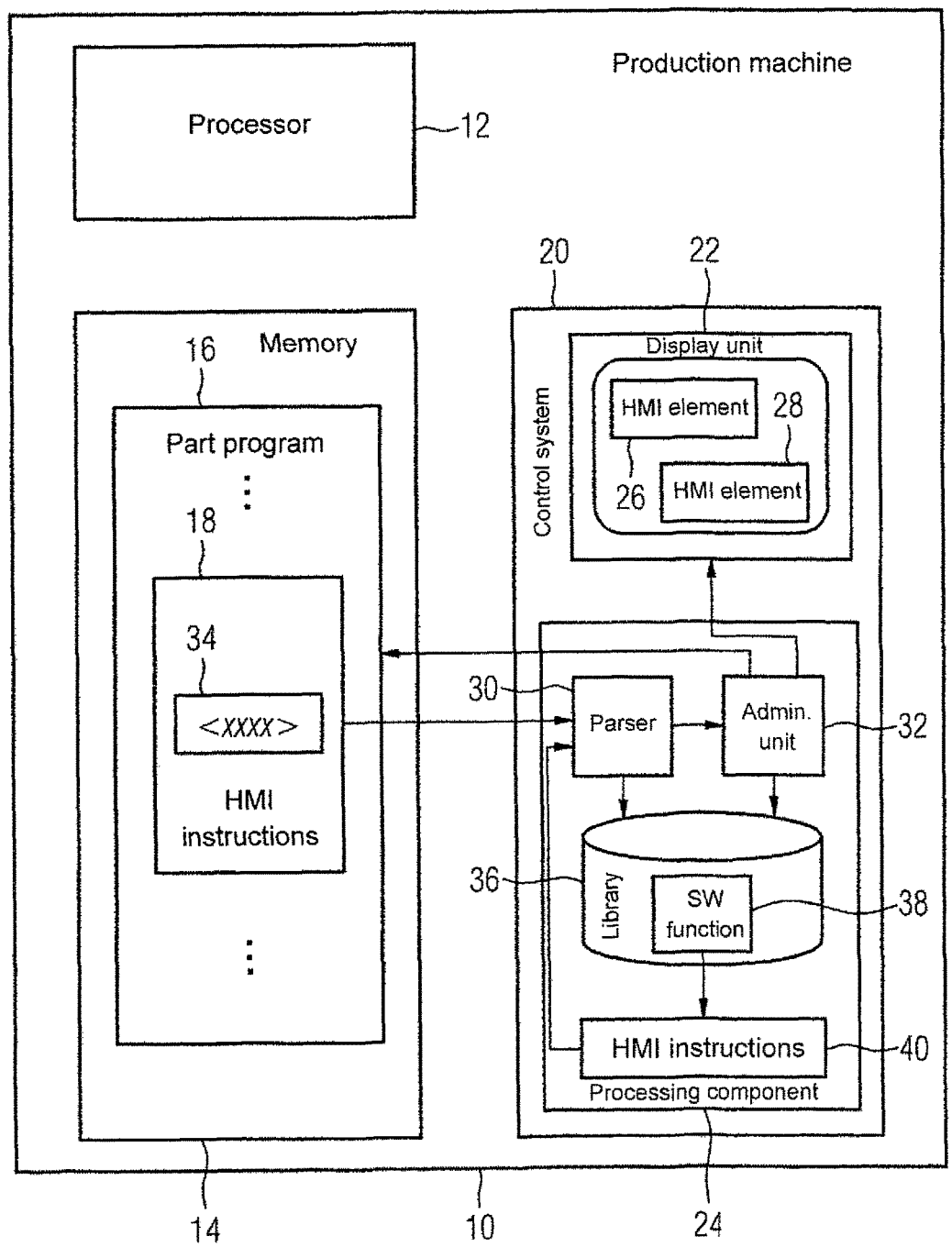
FIG. 2 shows a schematic diagram corresponding to FIG. 1 with additional functionality in the area of the processing component.

The approach presented here also permits in another way an HMI output which depends on a status of the part program 16 and/or on statuses of the machine 10 which are administered by the part program 16. As an example of this, a short part program 16 is copied in below, and the further explanation relates to this together with the supplemented diagram of FIG. 2 opposite FIG. 1:

```
;<r_parameter_list>
; <!-- r parameter shown with text -->
;
; <variabie index="0" text="R-Parameter index 0" />
; <variable index="1" text="R-Parameter index 1" />
; <variable index="2" text="R-Parameter index 2" />
; <variable index="3" text="R-Parameter index 3" />
; <variable index="4" text="R-Parameter index 4" />
; <variabie index="5" text="R-Parameter index 5" />
;
;</r_parameter_list>
F1000 G94
G0 X0 Y0
G91
R[1]=20
R[2]=30
R[3]=40
R[4]=20
Y= R[1] X100
M2
```

The text enclosed between the labels 34 "<r_parameter_list>" and "</r_parameter_list>" represents the HMI instructions 18 embedded in the part program 16, and the labels 34 tie the HMI instructions 18 together as a block, that is they define the beginning and the end of the HMI instructions 18. When the parser 30 identifies the label 34 <r_parameter_list> this causes the invocation of a software function 38 which, for example, is also defined in the form of an XML code and is stored in the library 36. The specific function can then be freely defined. In the present example, so-called R-parameters, that is computational parameters for the processing program, are to be extracted from it.

In the case of the example shown, a value is assigned to each of the computational parameters by the instructions "R[1]=20", "R[2]=30", "R[3]=40" and "R[4]=20". For the purpose of identifying these instructions and for extracting the relevant items of data, the software function 38 which is invoked itself acts at least partially as a parser, or calls up a parser 30. The HMI instruction 18 "<variable index="1" text="R-Parameter index 1"1>" within the block defined by "<r_parameter_list" and "</r_parameter_list>" makes of the relevant computational parameter which is to be extracted more specific (index="1") and incorporates details for the HMI output (text="R-Parameter index 0"). Because, in the example described here, the invocation of the software function is effected by reference to the label "<r_parameter_ list>", a reduced amount of data (index="1") is sufficient for the further specification of the particular computational parameter which is specifically to be extracted. However, this is specific for the extraction of computational parameters for the part program 16, and in the case of the extraction of other items of data from the part program 16 some other type of specification may be necessary.

The processing of the part program 16 by the software function 38 which was invoked is effected, for example, by a so-called SAX parser. As is known, such a parser processes a file, in this case the part program 16, line-by-line, and for each returns individual results, including also labels 34 and the like contained in the line concerned. It is possible in this way, by appropriate programming of the software function 38, to search automatically by this for particular labels 34, so in this case labels 34 which identify a computational parameter. When a label 34 which is sought has been identified, the software function generates an HMI element 26, 28, or more precisely the code for an HMI element 26, 28 or the code for invoking an HMI element 26, 28.

In the example selected, the resulting HMI element 26, 28 effects the display of the instantaneous value of the computational parameter concerned, together with an explanatory text, which is basically freely selectable (text="R-Parameter index 1"). The resulting HMI instruction, generated by the software function 38 during the automatic evaluation of the part program 16, then reads, for example:

---

<control name = "EditR1" xpos = 8 ypos = 10 refvar = "[Reference to variable list[1]]"/>
<control name = "TextR1" xpos = 20 ypos = 10 refvar = "[Reference to text list[1]]"/>.

---

Here, "EditR1" and "TextR1" are names, "8" and "10" or "20" and "10" respectively are the positions of the HMI output and, by "refvar", in this case the value of the first computational parameter (R[1]), together with the text ("R-Parameter index 1") assigned to the HMI instructions 18 incorporated in the framework of the part program 16 are read out in a list of variables or texts are transferred indirectly, that is in the form of a reference, and are used for the HMI output.

If the software function 38 generates code for an HMI element 26, 28 then, apart from the HMI instructions 18 incorporated in the part program 16, further HMI instructions 40 may sometimes result, namely for example in the memory of the control and monitoring system 20 or of the processing component 24, and when the part program 16 is executed these are then executed in the course of the processing the HMI instructions 18 incorporated in the part program 16. They may be immediately executable or may reference an HMI function held ready in the library 36. In this way, alongside the HMI instructions 18 incorporated in the part program 16 an additional level virtually arises, with further HMI instructions 40. Finally, these can again be evaluated, precisely like the HMI instructions 18 incorporated in the part program 16, in that the further HMI instructions 40 are evaluated by the parser 30 or a separate parser, and HMI elements 26, 28 referenced in them are identified and, for each identified HMI element 26, 28, an HMI output is generated by the HMI element administration unit 32 or a separate administration unit.

Although the invention has been illustrated and described in more detail by the exemplary embodiment, the invention is not restricted by the example(s) disclosed, and a specialist can derive other variations from these without going outside the scope of the protection for the invention. The approach described here simplifies the creation of generic dialog masks by the user. The specification of any particular dialog mask and the HMI elements 26, 28 which it incorporates are held in the part program 16 concerned, so that it is possible, for example, to offer program-specific masks for the input of process parameters.

Individual salient aspects of the description submitted here can thus be briefly summarized as follows: using the approach presented here, a production machine or machine tool 10 is specified, into the memory 14 of which is loaded a part program 16 which incorporates HMI instructions 18 in the form of script segments, together with a corresponding method and a computer program 24 for executing the method, wherein the HMI instructions 18 can be evaluated by a processing component 24 during the execution of the part program 16 and wherein a display unit 22 can be controlled by the processing component 24 for the purpose of showing HMI outputs 26, 28.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A production machine comprising:
   a control and monitoring system,
   a memory having a part program loaded into the memory and incorporating Human-Machine-Interface (HMI) instructions for the control and monitoring system,
   a processor executing the part program,
   a processing component comprising an evaluating language element constructed as a parser, and an administrating HMI element, wherein the processing component evaluates a syntax or semantics defined for the HMI instructions during execution of the part program, and
   a displaying controlled by the processing component and displaying HMI outputs,
   wherein the evaluating language element identifies HMI elements that are referenced in the HMI instructions and successively identifies individual labels incorporated in the HMI instructions,
   wherein the administrating HMI element generates an HMI output for each identified HMI element, and
   wherein the HMI instructions are embedded in the part program in XML format and wherein, when the HMI instructions are identified by the evaluating language element, a software function is initiated based on the identified individual label, with the software function defined as an XML code and being stored in a library.

2. The production machine of claim 1, wherein the processing component is embodied as a computer program that is loaded into a memory of the production machine and executed by a processor of the production machine during operation of the production machine.

3. The production machine of claim 1, wherein for identification of the HMI instructions and for extracting relevant items of data from the part program, the initiated software function itself acts at least partially as the parser, or calls up the parser.

4. A method for operating a production machine, comprising:
executing a part program that incorporates Human-Machine-Interface (HMI) instructions for a control and monitoring system,
during execution of the part program, determining the HMI instructions with a processing component which includes an evaluating language element configured as a parser that evaluates a syntax or semantics defined for the HMI instructions and successively identifies individual labels incorporated in the HMI instructions
generating with an administrating HMI element a corresponding HMI output for each identified HMI element, and
a displaying controlled by the processing component and displaying HMI outputs,
wherein the HMI instructions are embedded in the part program in XML format and wherein when the HMI instructions are identified by the evaluating language element a software function is initiated based on the identified individual label, with the software function defined as an XML code and being stored in a library.

5. The method of claim 4, further comprising:
executing the software function and generating additional HMI instructions during execution of the identified software functions,
determining the additional HMI instructions with the evaluating language element and identifying additional software functions referenced in in the additional HMI instructions, and
generating with the administrating HMI element a corresponding HMI output for each identified HMI element.

6. A computer program stored on a non-transitory computer-readable medium and comprising with program code, wherein when the program code is loaded into a memory of a production machine and executed by a processor of the production machine, causes the production machine to execute a part program that incorporates Human-Machine-Interface (HMI) instructions,
determine, during execution of the part program, the HMI instructions with a processing component which includes an evaluating language element configured as a parser that evaluates a syntax or semantics defined for the HMI instructions and successively identifies individual labels incorporated in the HMI instructions,
generate with an administrating HMI element a corresponding HMI output for each identified HMI element, and
control with the processing component a displaying of the HMI output,
wherein the HMI instructions are embedded in the part program in XML format and wherein when the HMI instructions are identified by the evaluating language element a software function is initiated based on the identified individual label, with the software function defined as an XML code and being stored in a library.

7. A computer program product comprising a non-transitory computer-readable medium with computer-readable program code stored thereon, wherein when the program code is loaded into a memory of a production machine and executed by a processor of the production machine, causes the production machine to execute a part program that incorporates Human-Machine-interface (HMI) instructions,
determine, during execution of the part program, the HMI instructions with a processing component which includes an evaluating language element configured as a parser that evaluates a syntax or semantics defined for the HMI instructions and successively identifies individual labels incorporated in the HMI instructions,
generate with an administrating HMI element for a control and monitoring system a corresponding HMI output for each identified HMI element, and
control with the processing component a displaying of the HMI output,
wherein the HMI instructions are embedded in the part program in XML format and wherein when the HMI instructions are identified by the evaluating language element a software function is initiated based on the identified individual label, with the software function defined as an XML code and being stored in a library.

* * * * *